(12) United States Patent
Anderson

(10) Patent No.: US 7,967,338 B1
(45) Date of Patent: Jun. 28, 2011

(54) TRAILER CHASSIS

(76) Inventor: Russell L Anderson, Truckee, CA (US)

( * ) Notice: Subject to any disclaimer, the term of this patent is extended or adjusted under 35 U.S.C. 154(b) by 0 days.

(21) Appl. No.: 12/659,900

(22) Filed: Mar. 24, 2010

(51) Int. Cl.
  *B62D 63/06* (2006.01)
  *B62D 21/00* (2006.01)
  *B60P 3/32* (2006.01)

(52) U.S. Cl. ........ 280/789; 280/783; 280/797; 280/798; 296/168

(58) Field of Classification Search ............. 280/789, 280/783, 781, 797, 798; 296/168, 184.1, 296/193.07, 203.1; 180/311
See application file for complete search history.

(56) References Cited

U.S. PATENT DOCUMENTS

| | | | | |
|---|---|---|---|---|
| 3,287,058 | A | * | 11/1966 | Wells ........................ 296/37.14 |
| 4,040,640 | A | | 8/1977 | Begg |
| 4,746,164 | A | * | 5/1988 | Crean ........................... 296/164 |
| 5,501,504 | A | * | 3/1996 | Kunz ............................ 296/164 |
| 5,921,615 | A | * | 7/1999 | Gimenez ...................... 296/164 |
| 6,502,894 | B1 | * | 1/2003 | Ingram et al. ................ 296/168 |
| 6,923,460 | B2 | | 8/2005 | Maloy |
| 7,175,202 | B2 | * | 2/2007 | Budica ......................... 280/781 |
| 7,338,109 | B1 | | 3/2008 | Crean |
| 2006/0103127 | A1 | * | 5/2006 | Lie et al. ...................... 280/781 |
| 2007/0199196 | A1 | | 8/2007 | Crean |
| 2007/0290495 | A1 | * | 12/2007 | Biscan ......................... 280/789 |
| 2008/0019814 | A1 | * | 1/2008 | Plante et al. ................. 414/482 |
| 2009/0166998 | A1 | * | 7/2009 | Groeneweg .................. 280/408 |

FOREIGN PATENT DOCUMENTS

EP 1526062 A2 4/2005

* cited by examiner

*Primary Examiner* — Paul N. Dickson
*Assistant Examiner* — Joselynn Y. Sliteris
(74) *Attorney, Agent, or Firm* — Richard C. Litman

(57) ABSTRACT

The trailer chassis includes a plurality of frame members forming a substantially rectangular box frame. The rectangular box frame includes a central, elongate main sub-frame integral with a pair of spaced outboard frame rail sections where wheel wells are formed. The central main sub-frame is devoid of cross members to provide unhindered storage space. Select sections of the rectangular box frame are covered with rigid plating to strengthen the torsional rigidity of the trailer chassis. The front section of the rectangular box frame includes a raised platform with a hitch frame integral thereto for installing a hitch. The trailer chassis is detachably mounted to the trailer in order to permit separate shipment of the trailer chassis in a shipping container.

6 Claims, 6 Drawing Sheets

TRAILER CHASSIS

BACKGROUND OF THE INVENTION

1. Field of the Invention

The present invention relates to vehicle chassis, and more particularly to a trailer chassis providing a substantial amount of storage space in a robust vehicular frame.

2. Description of the Related Art

A recreational vehicle (hereinafter referred to as RV) or RV trailer is basically a mobile home widely used for camping, road trips, vacations or weekend outings. It provides all the essential amenities of a household such as living room space, kitchen, bathroom and bedroom areas. The convenience of these amenities is unparalleled, but due to the mobile nature of RVs, the chassis must be sufficiently robust to handle the stresses of the road, especially in RV trailers. The chassis must also be strong enough to support the weight of the trailer housing and all the hardware and furniture contained therein.

A typical RV or travel trailer (also referred to as fifth wheel travel trailer due to the king pin hitch assembly) includes a chassis frame constructed with steel I-beams. Cross support I-beams are further supported by an array of cross members oriented to distribute the loads amongst the frame members much like a building or bridge truss. While this provides a strong foundation for the wheel axles and the subsequent trailer housing, the resultant chassis does not provide much usable space within the chassis below the walk-on floor. As a result, much of the essential components such as water and waste tanks and propane gas tanks must be stowed within and amongst the living quarters or components of the trailer, which limits maximal use of space and constrains the design layout of the trailer interior. Safety concerns also govern the layout because the weight must be distributed within the trailer so as to minimize or prevent the travel trailer from unhitching while traveling down the road.

Manufacturers of fifth wheel travel trailers also face economic concerns in relation to shipping and handling of the trailers to overseas markets. Most of these trailers cannot be packed into a shipping container so they are relegated to deck cargo, which is a more expensive option due, in part, to the special handling required. Deck freight can cost more than twice the amount for container freight. In light of the above, it would be a benefit in the art to provide a robust vehicular frame capable of maximizing stowage space and minimize shipping costs.

Thus, a trailer chassis solving the aforementioned problems is desired.

SUMMARY OF THE INVENTION

The trailer chassis includes a plurality of frame members forming a substantially rectangular box frame. The rectangular box frame includes a central, elongate main sub-frame integral with a pair of spaced outboard frame rail sections where wheel wells are formed. The central main sub-frame is devoid of cross members to provide unhindered storage space. Select sections of the rectangular box frame are covered with rigid plating to strengthen the torsional rigidity of the trailer chassis. The front section of the rectangular box frame includes a raised platform with a hitch frame integral thereto for installing a hitch. The trailer chassis is detachably mounted to the trailer in order to permit separate shipment of the trailer chassis in a shipping container.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
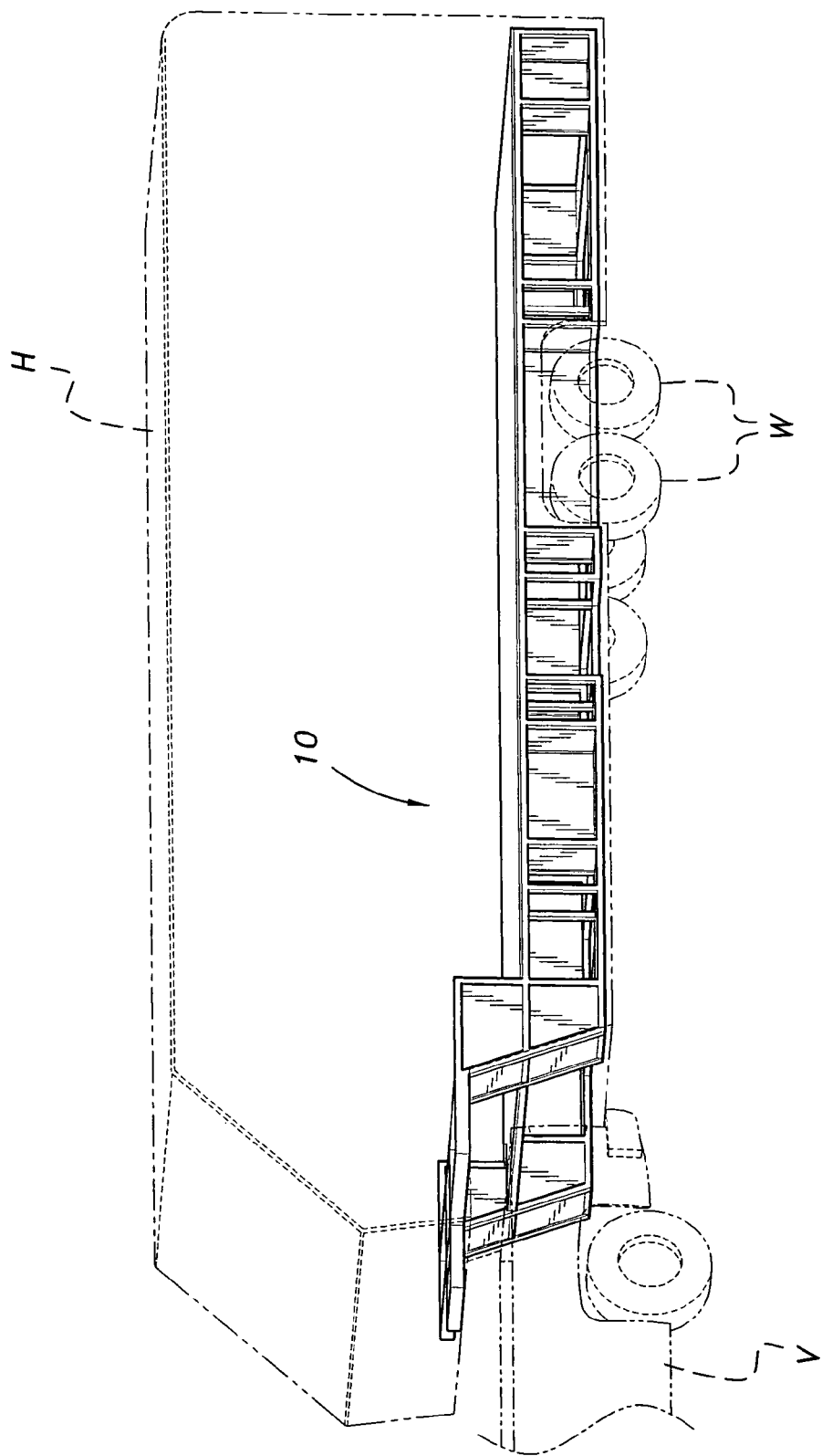
FIG. 1 is an environmental, perspective view of a trailer chassis according to the present invention.
Figure 2:
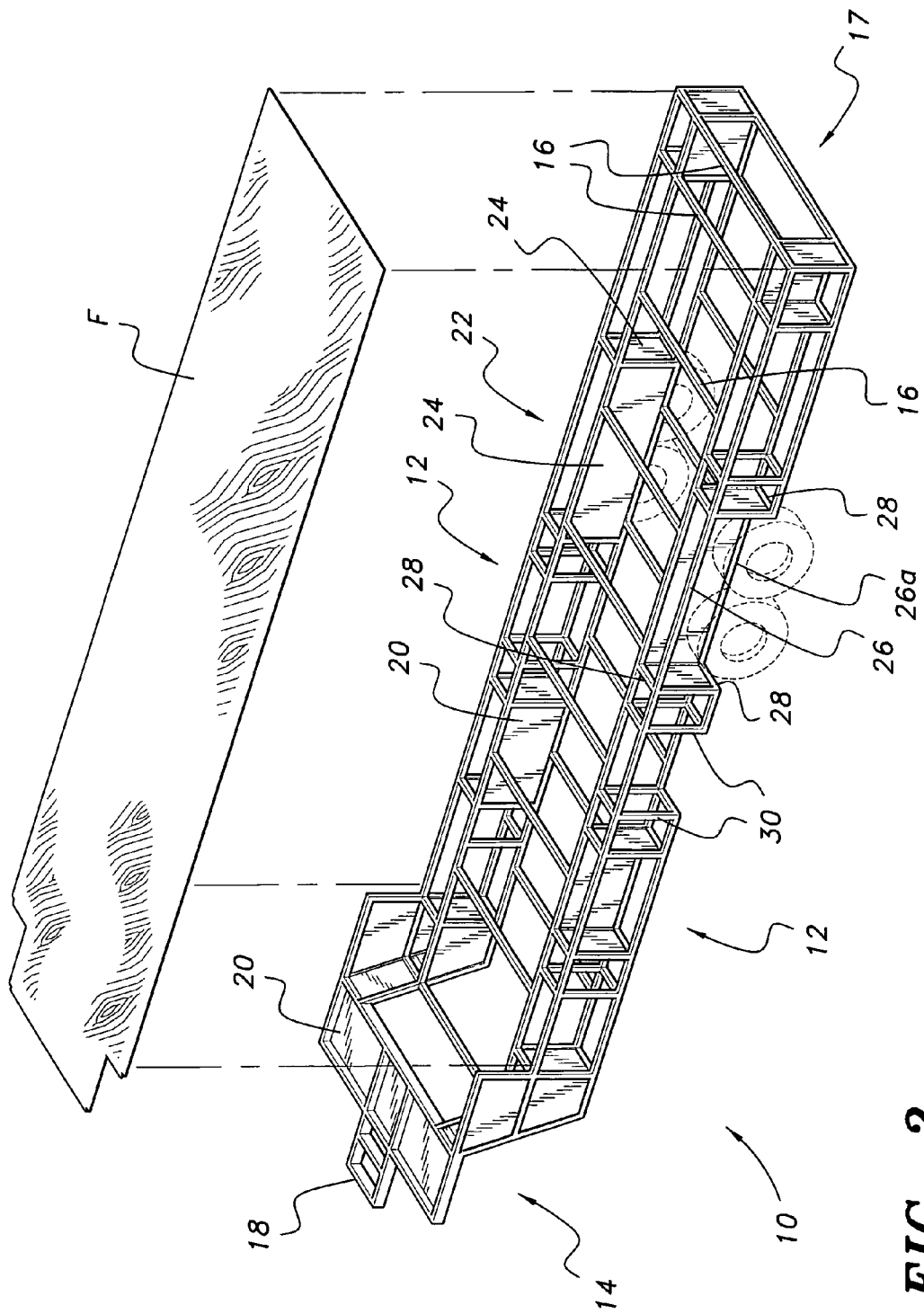
FIG. 2 is a perspective view of the trailer chassis according to the present invention.
Figure 3:
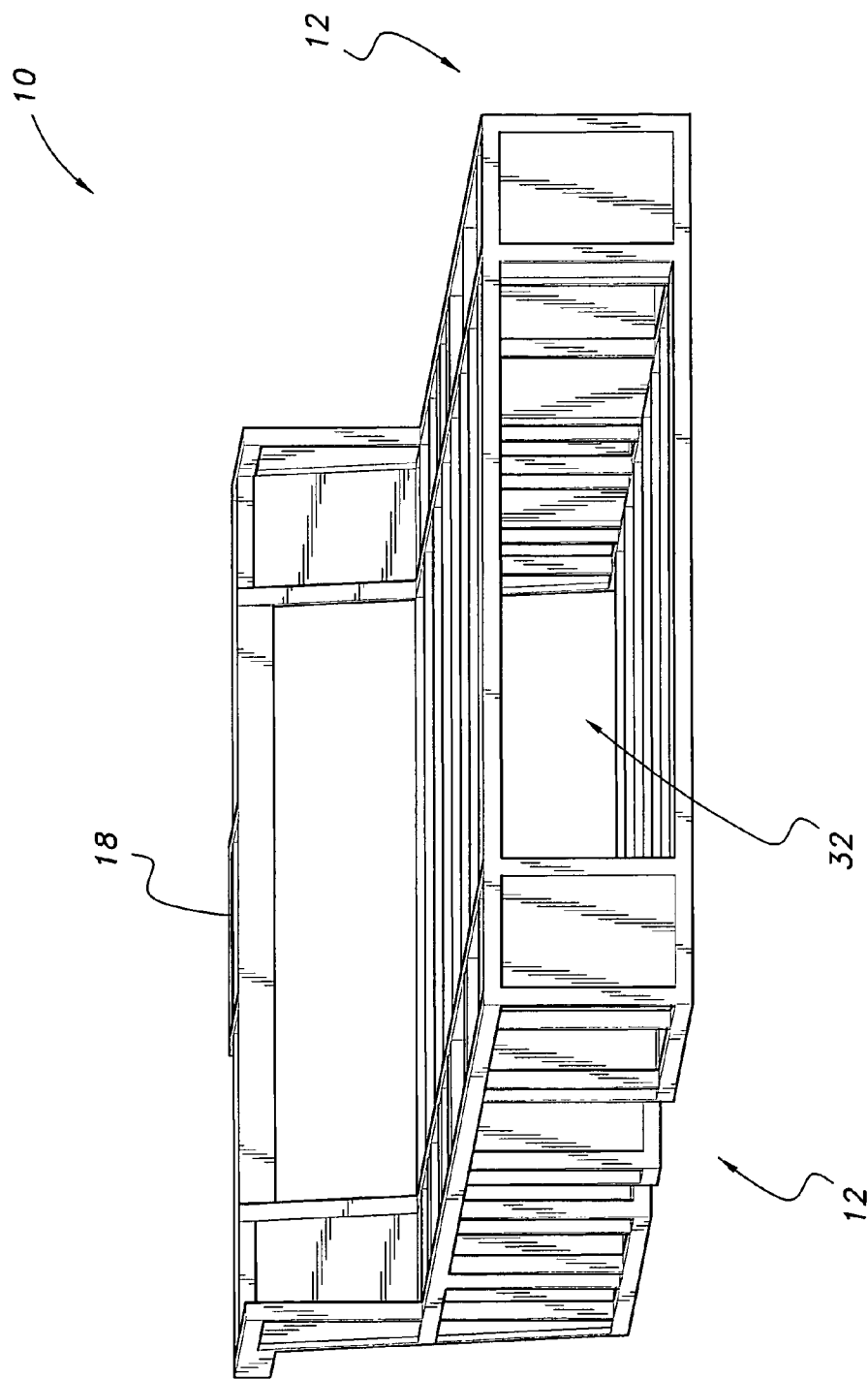
FIG. 3 is a rear perspective view of the trailer chassis according to the present invention showing the unhindered basement space throughout the length of the trailer chassis.

The present invention relates to a trailer chassis, generally referred to in the drawings by reference number 10, constructed to provide usable stowage space within a durable frame. As shown in FIGS. 1-3, the trailer chassis 10 is an elongate, substantially rectangular box frame formed by a plurality of square or rectangular steel tubing. Other materials for the tubing as well as shapes may also be used, such as aluminum. The rectangular frame includes an elongate, central main sub-frame 17 integral with two spaced apart frame sections forming outboard frame rails 12,12. A plurality of cross frame members 16 disposed at the top and bottom of the trailer chassis 10 and the vertical frame members 30 provide structural rigidity and support in the lateral and vertical directions.

The box frame alone, as shown in drawings, is fairly resistant to flexure and torsional stresses, which is a desirable factor due to the flex that a travel trailer experiences on the road. However, the trailer chassis 10 also includes a plurality of rigid panels or plating 20 welded or fastened onto corresponding frame members to form closed or boxed segments in the overall frame. This substantially increases the structural rigidity of the trailer chassis 10. Preferably, alternating portions of the rectangular box frame include the plating 20 to evenly distribute the stresses in a continuous manner, especially since not all the sections require the plating 20 to so perform. However, additional sections may include the plating 20 within weight limitations. As a further alternative, the plating may be replaced with brace members (not shown) to provide similar strengthening and torsional resistant characteristics. The brace members may be disposed diagonally or any other orientation that can resist torsional stress, or the brace members may be defined by a system of truss framework.

In light of the above, each of the outboard frame rails 12 includes a wheel well 22 formed by longitudinal top and bottom frame members 26, 26a, cross member 28 and vertical members 30 where the wheel well 22 is closed by plating 24. Since the wheels W will be experiencing much of the direct stresses from the road, the wheel wells 22 should be reinforced in the manner shown.

A hitch section 14 is formed at the front of the trailer chassis 10. The hitch section 14 may be a polygonal, box structure forming a raised platform from which a hitch frame 18 extends. A hitch, king pin or fifth wheel may be mounted to the hitch frame 18. Since the hitch section 14 directly experiences push and pull forces from the vehicle V, plating 20 covers much of the hitch section 14. The plating 20 on the hitch section 14 helps to resist and compensate for flexure along the length of the trailer chassis 10, as well as from the side.

When the trailer chassis 10 is assembled to form a foundation for the travel trailer, the top deck of the trailer chassis 10 is covered by flooring F, while the bottom deck is covered by similar flooring (not shown). The inclusion of at least the top flooring F forms an overall box construction, which further increases the structural integrity of the trailer chassis 10. This results in a structurally strong travel trailer foundation that is highly resistant to torsional stress. The flooring F is more robust than conventional flooring, and helps to eliminate the need for center cross-bracing. The flooring F helps to prevent flexing and twisting of the chassis frame rails, and transfers load stress both laterally and front-to-back.

In addition to the robust frame, the central main sub-frame 17 forms a roomy basement for the travel trailer. As shown in FIG. 3, the box frame construction of the central main sub-frame 17 forms an unhindered storage space or basement area 32 along the length of the trailer chassis 10. Unlike typical travel trailer chassis, the trailer chassis 10 does not include trussed sections that divide the basement area 32 into discreet compartments. As a consequence, the basement area 32 may be utilized to maximum effect as exemplified in FIG. 4. For example, the hitch section 14 provides space where propane gas tanks 40 may be stowed. In some cases, it may be large enough to stow bicycles. Luggage and equipment 42 may be stowed at various locations along the length of the basement area 32. A hot water furnace may be disposed in the compartment 44, while waste and water tanks may be stowed in the area above the wheel axles. The outboard discrete compartments formed by the plating 20 on the frame rail sections 12 may also be used to store tools or emergency supplies. The uncovered areas in the frame rail section 12 may provide access to the basement area 32. The height of the basement area 32 may be increased to accommodate a typical aluminum boat. With the various storage possibilities, especially for important hardware, it frees up space for the layout interior of the trailer housing H.

Figure 4:
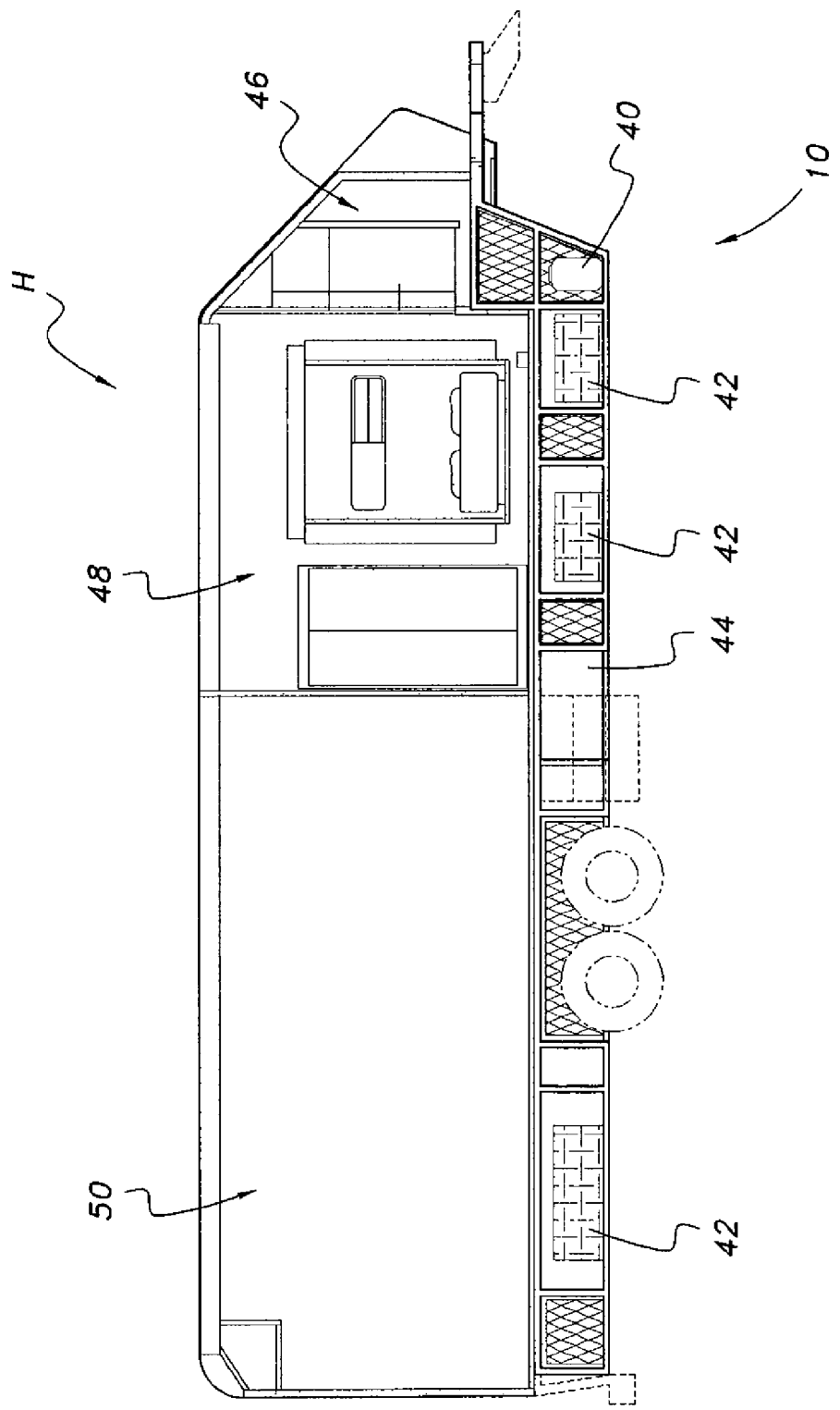
FIG. 4 is a diagrammatic side view in section of a trailer mounted on a trailer chassis according to the present invention.

As shown in FIG. 4, the front section of the trailer housing H may include a bathroom and bedroom compartment 48 while the rear section can be devoted to the kitchen and dining room areas 50. Some RV trailers have an overhanging section 46 above the fifth wheel for bedding, but due to the height difference between the fifth wheel platform and the flooring, it may be difficult for some to climb into the bedding. In contrast, the trailer chassis 10 minimizes that height difference so that the front section of the travel trailer is more easily accessible, i.e. the box frame of the trailer chassis 10 maintains the desired structural rigidity while allowing for variations in the storage volume of basement area 32 by changing the height, length and/or width. In addition, the trailer housing H may be configured to include extendable sections to expand the living area of the travel trailer.

Figure 5A:
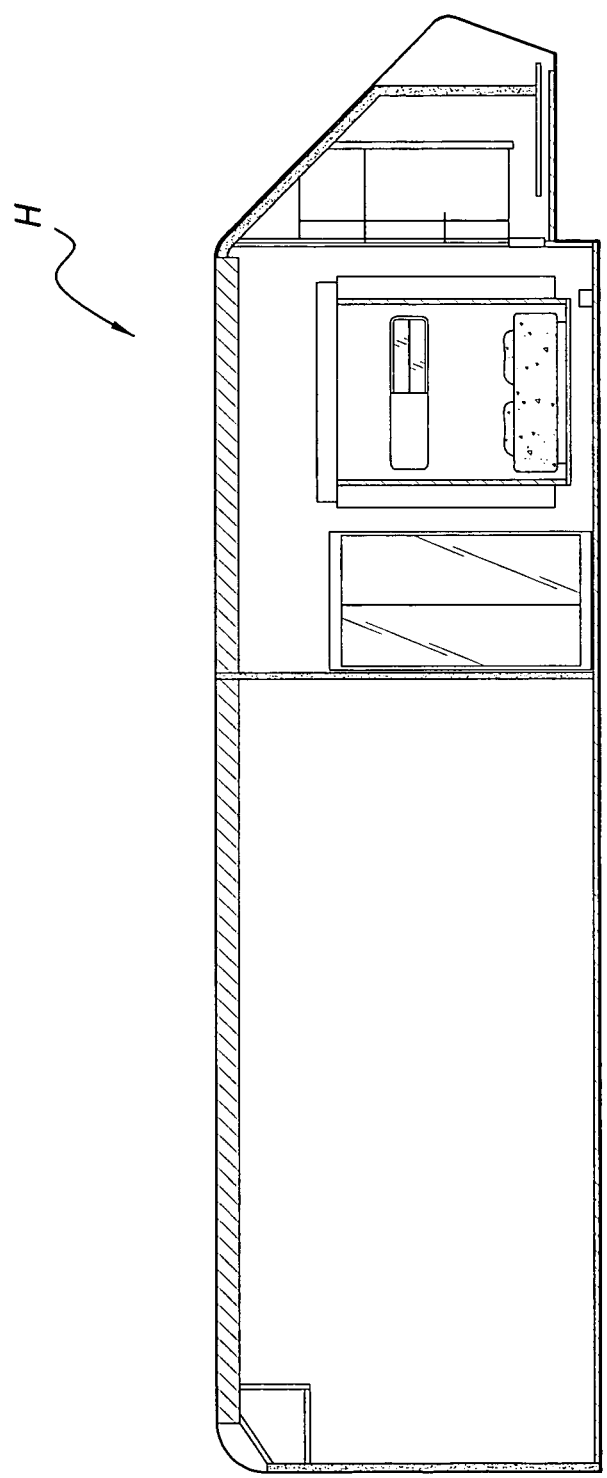
FIG. 5A is a sectional view of the trailer housing of FIG. 4, shown ready for shipment.
Figure 5B:
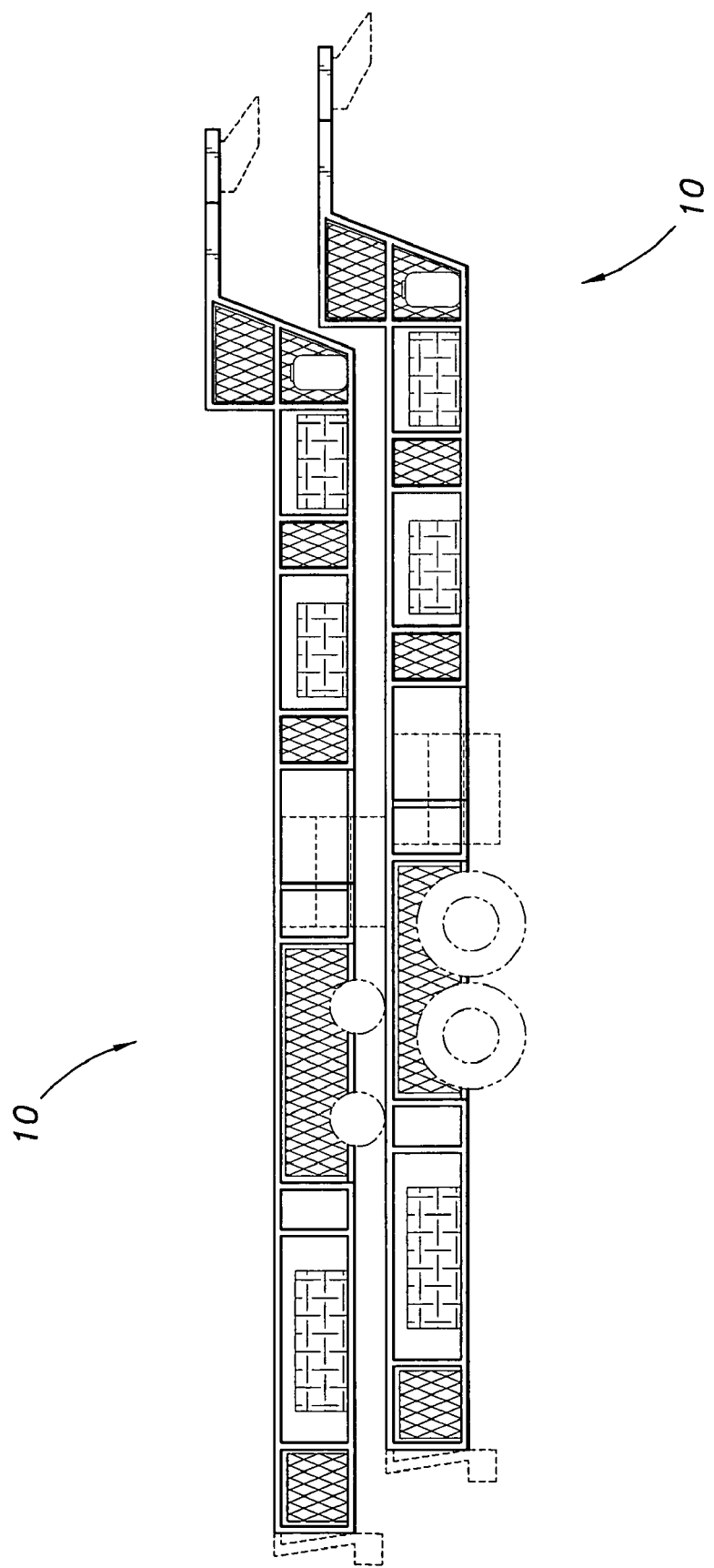
FIG. 5B is a diagrammatic side view in section of a plurality of trailer chassis according to the present invention, shown stacked for shipment.

Turning to FIGS. 5A and 5B, these drawings demonstrate how the trailer chassis 10 may be shipped. The resulting travel trailer is constructed so that the trailer housing H is detachable from the trailer chassis 10. As a result, the trailer housing H with all of its interior components may be placed in one shipping container. The trailer housing may include wheeled hardware (not shown) to help facilitate placement. The trailer chassis 10 may be stowed into another shipping container, and to utilize maximal space of the container, subsequent trailer chassis 10 can be stacked atop one another. This may require removal of the tires from subsequent trailer chassis 10.

It is to be understood that the trailer chassis 10 encompasses a variety of alternatives. For example, the trailer chassis 10 is preferably made from 2" or 3" tubing, but other dimensioned or shaped tubing may also be used. The frame of the trailer chassis 10 may also be formed through monocoque or molding processes.

It is to be understood that the present invention is not limited to the embodiments described above, but encompasses any and all embodiments within the scope of the following claims.

I claim:

1. A trailer chassis, comprising:
   an elongate, substantially rectangular box frame formed by a plurality of rectangular tubing members, the rectangular box frame having;
   an elongate, central main box sub-frame having an unhindered basement area along the length thereof and at least a top deck;
   an elongate frame rail section on each lateral side of the main box sub-frame and integral therewith, each of the frame rail sections having a wheel well and a top contiguous with the top deck;
   a front hitch section extending upwardly from the top deck, wherein the front hitch section comprises:
      an upwardly extending, polygonal box sub-frame, the polygonal box sub-frame having spaced polygonal sides and a sloping front contiguous with the polygonal sides forming a raised platform; and
      a hitch sub-frame extending from the raised platform; and
      flooring covering the top deck and the top of the lateral frame rail sections; and
   reinforcement members on select segments of the rectangular box frame to increase structural integrity thereof.

2. The trailer chassis according to claim 1, wherein said reinforcement members comprise plating covering the select segments of the rectangular box frame.

3. The trailer chassis according to claim 2, wherein each said wheel well of the frame rail sections comprises a rectangular box sub-frame covered on at least three sides with plates to form an opening for wheels.

4. The trailer chassis according to claim 2, wherein uncovered segments of the frame rail sections form discrete storage compartments.

5. The trailer chassis according to claim 1, wherein said reinforcement members comprise plating covering the select segments of the rectangular box frame, the polygonal sides and the front of said front hitch section being covered with plates.

6. The trailer chassis according to claim 1, wherein said reinforcement members are disposed at alternate segments of the rectangular box frame to increase torsional rigidity.

* * * * *